Figure 1:
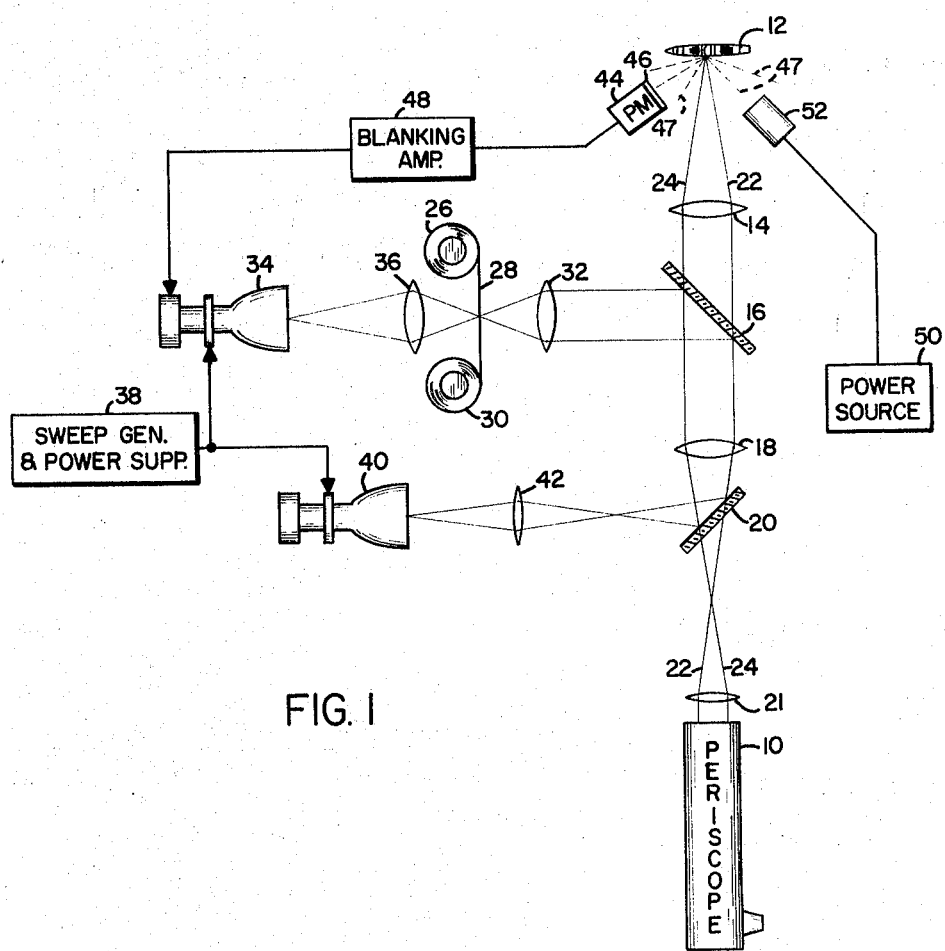

Jan. 24, 1967   A. W. SEAR   3,299,536
IMAGE COMBINING APPARATUS
Filed Dec. 30, 1964   2 Sheets-Sheet 1

INVENTOR.
ARTHUR W. SEAR
BY Charles J. Ungemach
ATTORNEY

INVENTOR.
ARTHUR W. SEAR
BY Charles J Ungemach
ATTORNEY

United States Patent Office 3,299,536
Patented Jan. 24, 1967

3,299,536
IMAGE COMBINING APPARATUS
Arthur W. Sear, Arcadia, Calif., assignor to Honeywell Inc., a corporation of Delaware
Filed Dec. 30, 1964, Ser. No. 422,119
8 Claims. (Cl. 35—25)

The present invention relates to apparatus and methods for combining optical images with a minimum of overlapping and interference. More particularly it relates to periscope simulators and apparatus to optically present a view of an object, such as a ship, superimposed on a suitable background view. However, although my invention is described herein as a periscope simulator, it should be understood that the techniques disclosed for combining images may be used in many other applications as well.

In order to train men to operate a periscope it is desirable to provide a land based simulated periscope which is capable of presenting a realistic view of a target on the ocean or in the air. A serious hindrance to this type of system is the problem of combining the images of a variety of targets with the image of a realistic background with enough optical efficiency to present a view which approaches the brightness of the image seen through an operational periscope. The present invention contemplates a novel and improved solution to this problem which, until the present invention, constituted a serious drawback to the operation of periscope simulator system.

A prior art solution to this problem has been to project the images of the various targets onto a screen and to view the screen through a simulated periscope. However, due to light diffusion at the screen, this system is very inefficient and only a very small percentage of the light actually reaches the periscope objective lens as useful light. The present invention overcomes these objections.

Briefly, the present invention comprises an optical system for viewing a target model with a simulated periscope. The model is illuminated with a flood light so as to present a bright image to the periscope. At the same time, by means of a half silvered beam splitter or other optical path combining means, the optical system views a film strip which has a suitable background scene such as an ocean and horizon on it. This film strip is illuminated by means of a cathode ray tube which has a type of phosphor that will provide white light of strong intensity. In order to prevent the two images from appearing on top of each other in the periscope the cathode ray is caused to blank out whenever it is illuminating a portion of the background film which corresponds to the target model. This blanking out is accomplished by operating a second cathode ray tube which is synchronized with the first cathode ray tube so that the second tube transmits light in the violet end of the spectrum backwards through the optical system to illuminate the target model. The two cathode ray tubes are driven by the same sweep generator so that their pattern of tracing is identical. A photomultiplier tube is positioned near the target model with a violet filter in front of it. Whenever violet light is scattered off of the target model the photomultiplier tube transmits a signal to a blanking amplifier which stops the background illuminating cathode ray tube from giving off light. Consequently, the optical system accepts a view of the target model which may be positioned in any realistic attitude and combines this image with a background image having a hole in it which corresponds exactly to the image of the target model.

It is an object, therefore, of the present invention to provide a periscope simulator system in which images of targets may be realistically combined with a suitable background scene while maintaining a suitable degree of brightness.

Figure 2:
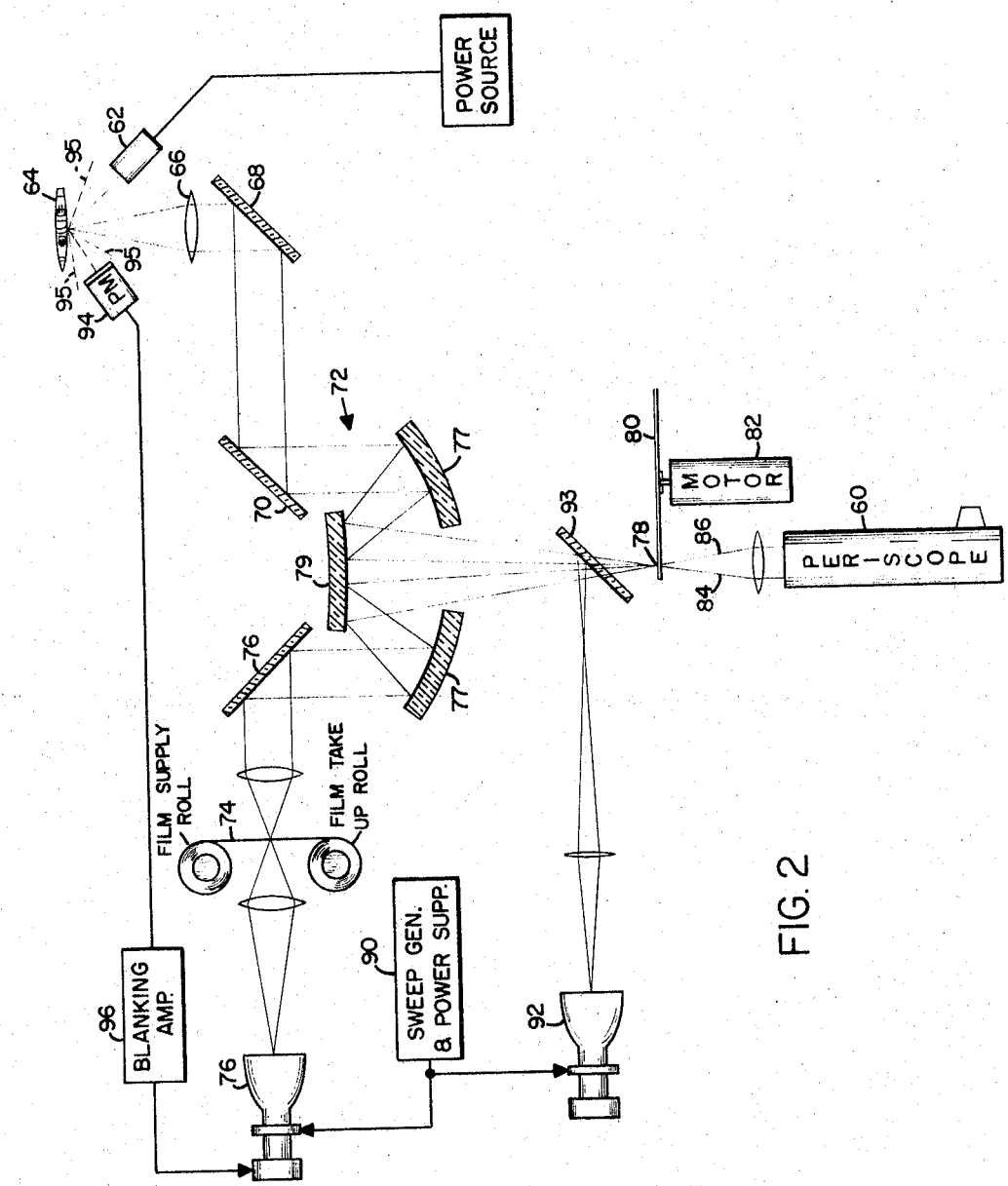

Further objects and advantages will become apparent in the following description and drawings in which:

FIGURE 1 is a schematic diagram of the principles of operation of one embodiment of my invention, and FIGURE 2 is a schematic diagram of another embodiment of my invention.

Referring to FIGURE 1, a simulated periscope 10 is shown viewing a target model 12. The light from model 12 reaches periscope 10 by passing through a lens 14, a beam splitter 16, a lens 18, another beam splitter 20, and a lens 21 as shown by a pair of representative lines 22 and 24. A supply roller 26 supplies suitable background film transparency 28 showing, for example, various seascapes for viewing by the periscope 10. Film 28 is shown as movable between supply roller 26 and a takeup roller 30 so that any desirable background scenes may be selected by moving roller 26 and 30. Periscope 10 views the background film 28 by means of a lens 32, beam splitter 16, lens 18 and lens 21. Thus, the image of the target model 12 and the particular background scene on film 28 are coincident when they enter periscope 10.

Mechanical apparatus, not shown, causes film 28 to move when simulated periscope 10 rotates so as to give the operator the impression that the periscope really is turning relative to the background scene.

Background film 28 is illuminated by means of a flying spot scanner 34 and a lens 36. Flying spot scanner or cathode ray tube 34 is driven by a sweep generator and power supply 38 so that constant illumination is provided to the film 28. However, sweep generator 38 also drives a cathode ray tube or flying spot scanner 40 which projects light in the violet end of the spectrum through lens 42, off of beam splitter 20, through lens 18, beam splitter 16, and lens 14 to target model 12. Flying spot scanner 40 utilizes a type of phosphor which produces light rich in the violet wavelengths so that it will not interfere with the illumination of film strip 28 by visible light from scanner 34 nor illuminate the model 12 at the wrong time. A photomultiplier tube 44 is positioned behind a violet filter 46 so as to detect any violet light which is scattered off of target model 12. This scattered light is represented by a set of dashed lines 47. Whenever scattered violet light 47 is detected by tube 44 it means that the light beam from scanner 40 is crossing the target and, since scanners 34 and 40 are synchronized and sweep identically, being driven by the same sweep generator 38, the scanner 34 is illuminating a portion of the background on film 28 which corresponds in periscope 10 to the model 12. Consequently, to eliminate this overlapping in periscope 10, photomultiplier tube 44 operates a blanking amplifier 48 so as to prevent the generation of light by scanner 34. In other words, since scanners 34 and 40 are projecting identical light patterns, whenever scanner 34 is projecting toward an area on film 28 which corresponds to the position model 12 should occupy as seen by periscope 10, the scanner 40 is scattering violet light off of model 12 so that photomultiplier tube 44 may blank out scanner 34, thereby, preventing an overlapping between the two images from the film 28 and the model 12. The face of scanner 34 will thus appear as a bright source of light in which a dark portion of silhouette representative of the model 12 appears. The periscope 10 would see the background image with a dark hole therein if it were not also viewing the model 12 directly. With proper adjustment, the direct image of model 12 is made to fit into the dark hole in the background image so that the operator sees a realistic view of the model in a realistic background.

Since photomultiplier tube 44 need only detect scattered violet light of a predetermined frequency it may be made very sensitive. A power source 50 operates a lamp 52 which illuminates target model 12 so that it may be clearly seen by periscope 10. In the preferred embodiment target model 12 may be positioned by means not shown in any desired attitude so as to realistically depict a target situation.

FIGURE 2 shows another embodiment of my invention which operates on the same principles but employs an even more efficient optical collection system so as to increase the brightness of the image seen by a periscope 60. In FIGURE 2 a lamp 62 illuminates a target model 64 when target 64 is to be viewed. If desired, lamp 62 may be moved about so as to simulate the position of the sun at any time of the day as it would shine on a real ship. The light from target model 64 travels through a collimating lens 66 to a mirror 68 where it is reflected to a mirror 70 which reflects the light into a Maksutov Cassegrain optical system generally indicated by the numeral 72. The background scene is provided by a film 74 as already described which is illuminated by a flying spot scanner 76 in the same manner as shown in FIGURE 1. The background image from film 74 is projected onto a mirror 76 which reflects the image into the Maksutov optical system 72 in the same manner as the image of the target model 64. The Maksutov Cassegrain optical system operates to reflect the two images from a mirror 77 to a mirror 79 and thence through a hole in mirror 77 so as to focus the two images at a point 78. Positioned at point 78 is a disk of ground glass 80 which is rotated by a motor 82. Ground glass disk 80 diffuses the light from the two images so that the two images formed at point 78 become new sources of light and, thereby, form a new combined image which follows the paths shown by a pair of lines 84 and 86. Consequently, a coincident image of the target model 64 and the background scene on film 74 are efficiently transmitted into periscope 60. Due to the fine grain structure present in ground glass it is desirable to rotate ground glass dish 80 so as to eliminate the course grainy structure of the image at periscope 60 which would result if dish 80 did not rotate. Since the Maksutov Cassegrain optical system is circular a number of target models may be viewed simultaneously by providing more lens and mirrors like lens 66 and mirror 70 disposed about circular mirror 79. Selection is had by illuminating the desired target model with a lamp such as lamp 62 and activating the particular photomultiplier tube which monitors the desired target model. If desired, mirrors 70 and 76 may be made adjustable. For instance, if mirror 70 were slowly rotated it would appear through periscope 60 that target model 64 was moving across the field of view. Thus, movement of target model 64 may be simulated or movement of the background may be simulated by rotating mirror 76. As before, a sweep generator and power supply 90 drives both the illuminating scanner 76 and another scanner 92. Scanner 92 transmits violet light backwards through the optical system to target model 64 by means of a dichroic mirror 93. A photomultiplier tube 94, sensitive to the violet light scattered off of target model 64 as shown by a set of dashed lines 95, actuates a blanking amplifier 96 so as to blank out the light from scanner 76 whenever it is illuminating a part of the background on filmstrip 74 which corresponds to target model 64 as seen by periscope 60. In the embodiments of both FIGURES 1 and 2 the cathode ray tubes utilize short persistance phosphors so as to prevent any lagging of the correlation between images when the images move.

It is therefore seen that apparatus has been provided which will realistically present a scene such as would be seen through an operational periscope, of ships and the like on the ocean. It should be understood that many modifications may be made to the device shown in the preferred embodiments by one skilled in the art and I therefore do not wish to be limited to the specific disclosures used with the reference to the preferred embodiment, but intend only to be limited by the following claims.

I claim:

1. A system for combining a plurality of coincident, partially exclusive images without overlap comprising in combination:
   an optical system operable to simultaneously and coincidently receive light from first and second areas;
   means scanning said first area with a first light beam so as to incrementally illuminate said first area;
   means scanning said second area with a second light beam so as to indicate the position of viewable objects in said second area; and
   means for stopping said first light beam from illuminating portions of said first area when said second light beam indicates that said viewable objects are coincident with said portions of said first area in said optical system.

2. A system for superimposing the image of an object and the image of an area without interference comprising:
   an optical system for simultaneously and coincidentally receiving light from a first area and a second area;
   a first cathode ray tube for illuminating said first area;
   a second cathode ray tube for illuminating objects in said second area;
   means coordinating the scanning patterns of said first and said second cathode ray tubes; and
   means causing said first cathode ray tube means to stop illuminating said first area when said second cathode ray tube means is illuminating said viewable objects.

3. Apparatus to simulate the view of targets in any position upon a background scene as seen through a periscope comprising:
   image collecting means operable to provide a plurality of optical paths into a simulated periscope;
   target models adapted to be viewed by said image collecting means;
   a filmstrip in one of the plurality of optical paths so as to coincidentally present to said image collecting means the image on the film and the image of said target models; and
   filmstrip illuminating means adapted to illuminate only that portion of the film in which the image is not coincident with the image of the models as seen by the periscope, said illuminating means comprising a light detector means and a first cathode ray tube which is synchronized and aligned with a second cathode ray tube so that said first tube may be blanked out whenever said second tube is illuminating said models, said illumination being indicated by said light detector means.

4. The method of preventing visual overlap between an image of a target model and an image of a background scene superimposed thereon as seen through a simulated periscope system which comprises the steps of:
   scanning the image which includes the target model with a first beam of a first radiation;
   detecting when said first beam crosses said target model;
   scanning the image which includes the background scene with a second beam of a second radiation of wave length in the visible range;
   coordinating said first and said second beams to scan in a substantially identical pattern;
   blanking out said second beam when said first beam crosses said target model; and
   simultaneously and coincidentally presenting the light from both images to the simulated periscope.

5. A periscope simulating system for combining the images of an assumed target and an assumed background scene comprising in combination:

an optical system for simultaneously viewing a plurality of areas;

first and second cathode ray tube scanners adapted to scan in a substantially identical pattern, said first scanner generating radiation in the violet end of the spectrum;

target models;

a background scene;

means presenting said background scene within one of said areas;

means presenting said target models within other of said areas so as to provide a combined coincident image to said optical system;

means causing said first scanner to scan said models;

means detecting the incidence of radiation from said first scanner on said model; and means causing said second scanner to illuminate said background scene except where said detecting means indicates that the image of the model and the image of the background scene are coincident in the optical system.

6. The method of simulating the view through a periscope in which a typical target is displayed on a typical background scene which involves:

simultaneously and coincidentally receiving light from a target model and a background scene at the periscope;

scanning said target model with a first cathode ray tube;

scanning said background scene with a second cathode ray tube;

synchronizing said first and said second cathode ray tubes so that they scan in a substantially identical pattern; and blanking out the illumination of said second tube whenever said first tube is scattering illumination off of said model.

7. The method of forming a hole of a desired size in a background scene image which comprises the steps of:

scanning an object which is the desired size with a first beam of a first radiation;

scanning the background scene image with a second beam of illuminating radiation of wavelength in the visible range;

coordinating said first and said second beams to scan in a substantially identical pattern;

blanking out said second beam when said first beam crosses said object; and simultaneously and coincidentally presenting the reflected light from said first and second beams to a viewing device.

8. A periscope simulating system for combining the image of a target model and an assumed background scene comprising:

a Maksutov Cassegrain optical system for focusing the image of the target model and the background scene at a point;

a light transmitting diffusing surface at said point so as to combine the image of the target and the background scene and present said combined images to a simulated periscope;

means moving said diffusing surface so as to blur irregularities in said combined images caused by imperfections in said diffusing surface;

first and second cathode ray tube scanners adapted to scan in a substantially identical pattern, said first scanner generating radiation in the violet end of the spectrum;

means causing said first scanner to scan said target model;

means detecting the incidence of radiation from said first scanner on said target, model; and means causing said second scanner to illuminate said background scene except where said detecting means indicates that the image of the target model and the image of the background scene are coincident in the optical system.

References Cited by the Examiner

UNITED STATES PATENTS 2,753,395   7/1956   Lawrence _____ 178—7.2

FOREIGN PATENTS 743,402   1/1956   Great Britain.

EUGENE R. CAPOZIO, *Primary Examiner.*

R. W. WEIG, R. E. KLEIN, *Assistant Examiners.*